United States Patent Office 2,720,413
Patented Oct. 11, 1955

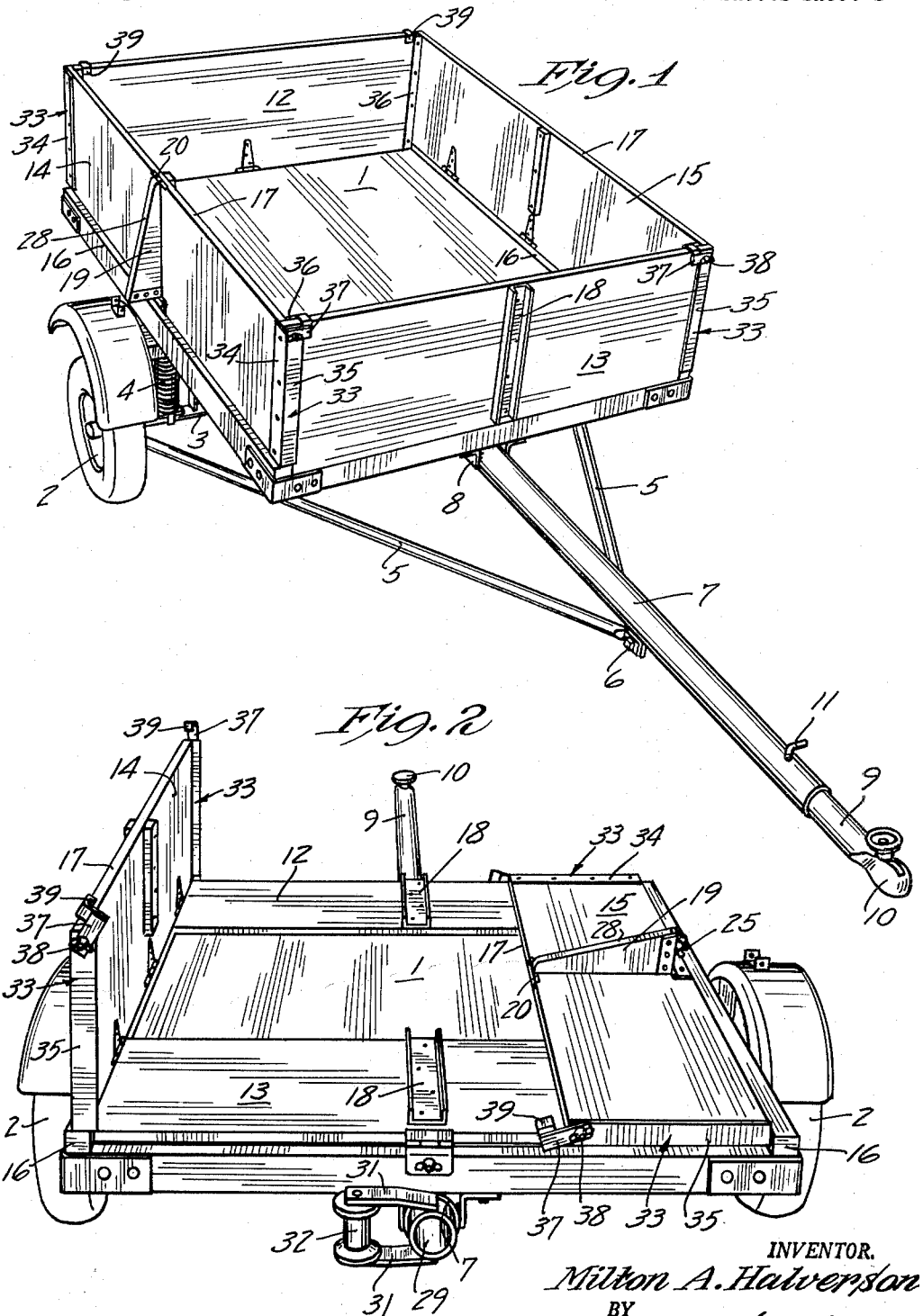

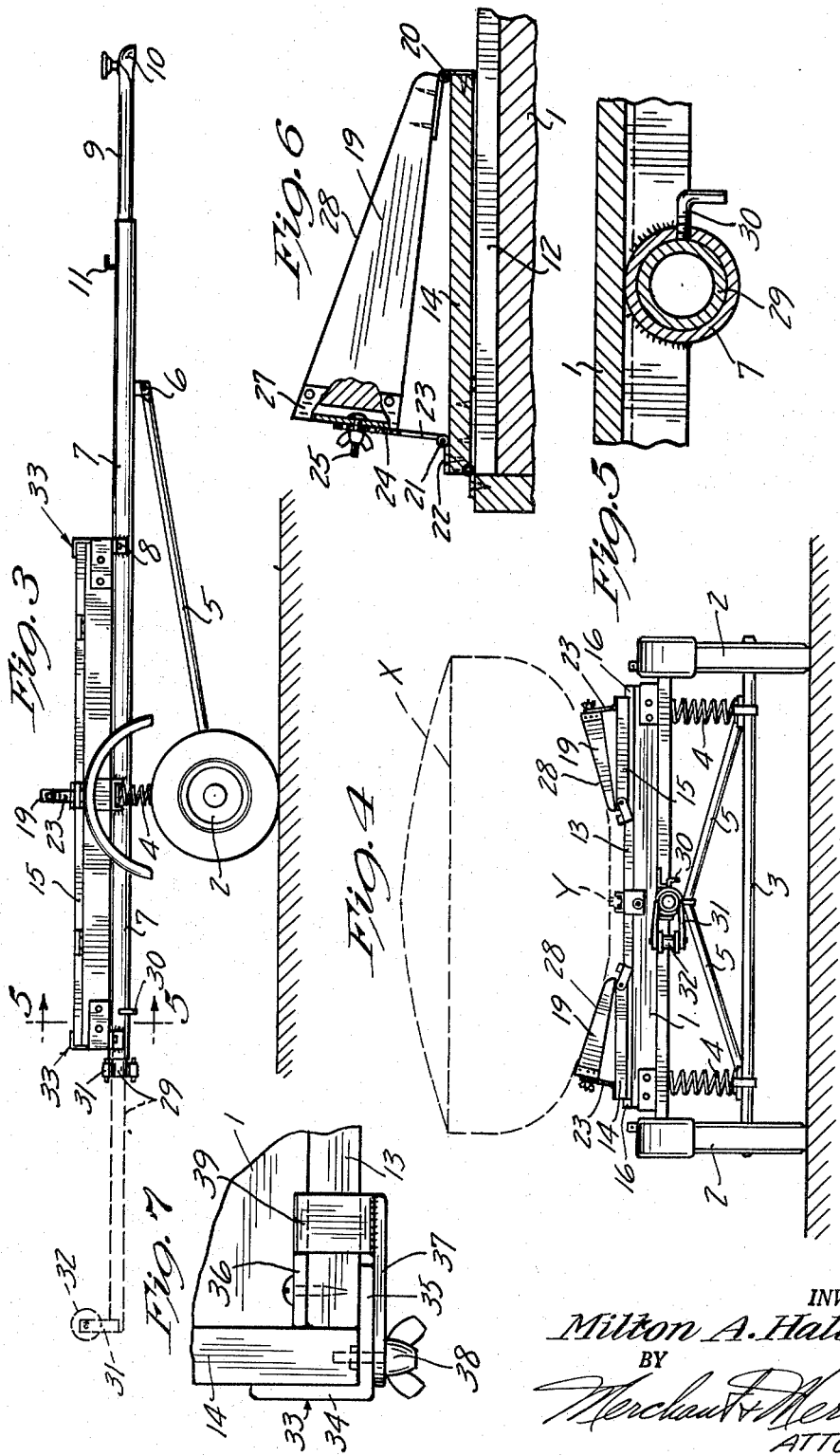

2,720,413

MULTI-PURPOSE TRAILER

Milton A. Halverson, Brainerd, Minn., assignor to Design-Rite Company, Brainerd, Minn., a corporation of Minnesota Application August 31, 1953, Serial No. 377,614

3 Claims. (Cl. 296—10)

My invention relates broadly to trailers of the type adapted to be detachably secured to automotive vehicles, and has for its primary object the provision of a multi-purpose device of this character. More specifically, the object of my invention is the provision of a trailer which may be readily converted from a conventional box type trailer to a boat trailer.

Still more specifically, an important object of my invention is the provision of a device of the class immediately above described which is extremely rugged and durable, and which will support boats of specifically different lengths by extension of parts thereof, and which is relatively inexpensive to produce.

The above and still further objects of my invention will become apparent from the following detailed specification, appended claims and attached drawings.

Referring to the drawings, wherein like characters indicate like parts throughout the several views;

Fig. 1 is a perspective view showing the front of my novel structure;

Fig. 2 is a perspective view from the rear with some of the parts thereof in a different position;

Fig. 3 is a view of the side elevation showing my device in a collapsed boat supporting position;

Fig. 4 is a view of the rear elevation illustrating its use in supporting a boat;

Fig. 5 is an enlarged fragmentary view, partly in section and partly in elevation, taken on the line 5—5 of Fig. 3;

Fig. 6 is an enlarged fragmentary view, in side elevation, of one of the boat bottom supporting flanges, some parts being broken away; and Fig. 7 is an enlarged fragmentary view in plan of the corner of my trailer in box forming position.

Referring with greater particularity to the drawings, the numeral 1 indicates the generally rectangular bed plate or bottom of my novel trailer. As shown, the bed plate 1 is supported by a pair of wheels 2 through the medium of an axle 3, springs 4, and a conventional wishbone 5, the converging forward ends of which are secured as at 6 to a tubular tongue or drawbar section 7 which is secured axially to the bottom surface of the bed plate 1 by means of suitable brackets 8. Preferably, and as shown, the drawbar 7 telescopically receives an extensible and retractible section 9, the forward end of which is provided with conventional coupler means 10. A locking screw 11 is provided for retaining the sections 7 and 9 in the desired set relationship.

Opposite pairs of end forming members 12 and 13 are hingedly secured to the opposite end portions of the bed plate 1 for swinging movements from the upstanding box forming positions of Figure 1 to the collapsed folded positions of Figure 2 wherein they overlie and engage the upper surface of the bed plate 1. Opposite side forming portions 14 and 15 respectively are likewise hinged along opposite side edge portions of bed plate 1 for swinging movements from the upstanding box forming positions of Figure 1 to the collapsed positions of Figures 3 and 4. As shown, the end forming members 12 and 13 underlie the side forming members 14 and 15. This is accomplished by hinging the latter to the upstanding rails 16 opposite longitudinal side edge portions of bed plate 1; whereas the end forming members 12 and 13 are hinged on a lower plane, to wit, the upper surface of the bed plate 1. Also preferably, and as shown, the free longitudinal edges 17 of the side forming members 14 and 15 are spaced apart when in the folded positions of Figures 2 and 4 so that boat keel receiving channel elements 18 may be secured in aligned relationship one each to the end forming members 12 and 13. As shown, the channels 18, when in position of Figure 2, extend longitudinally of the direction of travel of the vehicle and are centrally disposed with respect to the opposite side edges of the bed plate 1.

A pair of boat guiding and supporting flanges 19 are hingedly secured one each to the side forming members 14 and 15 adjacent longitudinal edges 17. As shown, the flanges 19 are preferably segmental in shape and extend transversely of the side forming members 14 and 15 so as to project upward therefrom when said members are in their folded positions of Figure 4. As shown, these flanges 19 support the bottom of a boat X when the keel Y thereof is in the aligned channels 18. To provide support for boats of varying contours, I provide means for adjustably raising and lowering the outer ends of the flanges 19. Preferably, and as shown, this means is in the nature of hinges 21, the wings 22 of which are secured as by screws or the like to the side forming members 14 and 15. The upstanding wings 23 of the hinges 21 are provided with spaced openings 24 adapted to selectively register with a thumb nut equipped bolt 25, the head of which is retained behind the U-shaped metal strap 27, rigidly secured to the outer end of flange 19. The upward and outward diverging surfaces of the flange 19 are identified by the numeral 28.

For the purpose of supporting the rearwardly projecting portion of the keel Y of the boat X, I provide a keel supporting bar 29 which is telescopically and rotatively received within the rear end portion of the tubular drawbar section 7. A locking screw 30, see Figure 5, is provided for retaining the keel supporting bar 29 in desired set, extended or retracted positions. Also preferably, and as shown, the rear end portion of the keel supporting bar 29 is provided with a pair of laterally projecting brackets 31 between the free ends of which is mounted for rotation a flanged rotor 32.

Another important feature of my invention is the provision of means for rigidly retaining the end members 12 and 13 and side members 14 and 15 in the upstanding box forming position of Figure 1. To this end I provide angular straps 33, the sides 34 of which are secured by rivets or the like to the opposite ends of the side forming members 14 and 15, so that the angular portions 35 thereof are spaced from the ends of the side members 14 and 15 a distance capable of snugly receiving there-between the opposite ends of the end forming members 12 and 13. In this manner, the end members 12 and 13 are positively prevented from inward collapsing movements when all of the members 12, 13, 14 and 15 are in the upstanding positions of Figure 1. To limit the side forming members 14 and 15 against inward movements, I secure narrow strips 36 transversely across the opposite end members 12 and 13 in spaced relation to the extreme ends thereof, a distance approximating the thickness of the side forming members 14 and 15. To positively lock the members 12, 13, 14 and 15 against outward swinging movements on their respective hinges from the load carrying position of Figure 1, I provide U-shaped hook elements 37 which are pivotally secured as at 38 to the upper end portions of portion 35 of straps 33. As shown in Figure 2, these hook elements 37 are adapted to have their free ends elevated so as to release the end forming members of 12 and 13.

However, when said hook elements 37 are in locking arrangement with the end forming elements 12 and 13, the inner ends 39 thereof are in abutting engagement with the upper end portions of the straps 36, see Figure 7. This arrangement makes it possible to carry heavy loads of granular material in the box shown in Figure 1 without loss of content or without strain on the parts thereof.

My invention has been thoroughly tested and found to be completely satisfactory for the accomplishment of the above objects and while I have disclosed a preferred embodiment thereof, it should be obvious that the same is capable of modification without departure from the scope of the appended claims.

What I claim is:

1. In a device of the class described, a generally rectangular bed plate, opposed pairs of end and side members hingedly secured to the opposite edge portions of said bed plate for swinging movements from upstanding box forming positions to folded positions overlying said bed plate, the free longitudinal edge portions of said side forming members being laterally spaced from each other when in said folded positions, aligned axial U-shaped boat keel receiving elements on said end forming members intermediate the spaced free edge portions of said side forming members, and transversely extending boat bottom guiding and supporting flanges secured to the intermediate portions of said side forming members and projecting upwardly when said members are in said folded positions.

2. Structure defined in claim 1 in which the said flanges are hingedly secured to said side forming members adjacent to the free side edges thereof and in further combination with means for adjustably raising and lowering the opposite ends of said flanges, and means for locking said flanges in desired set positions.

3. The structure defined in claim 2 in which said side members overlie said end members when said members are in said folded position.

References Cited in the file of this patent

UNITED STATES PATENTS

| | | |
|---|---|---|
| 2,374,383 | Sampsell | Apr. 24, 1945 |
| 2,456,013 | Nelson | Dec. 14, 1948 |
| 2,503,535 | Yarbrough | Apr. 11, 1950 |

FOREIGN PATENTS

| | | |
|---|---|---|
| 27,487 of 1912 | Great Britain | May 22, 1913 |